(12) United States Patent
Hu

(10) Patent No.: US 6,839,169 B2
(45) Date of Patent: Jan. 4, 2005

(54) OPTICAL APPARATUS AND METHOD FOR SELECTIVELY TRANSMITTING OPTICAL SIGNALS

(75) Inventor: Gongjian Hu, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 167 days.

(21) Appl. No.: 10/172,840

(22) Filed: Jun. 17, 2002

(65) Prior Publication Data

US 2003/0231389 A1 Dec. 18, 2003

(51) Int. Cl.⁷ .............................. G02B 27/28; G02F 1/13
(52) U.S. Cl. ...................... 359/484; 359/494; 359/500; 359/900
(58) Field of Search ................................. 359/484, 494, 359/495, 496, 497, 500, 900; 349/196, 197, 193, 194; 372/703

(56) References Cited

U.S. PATENT DOCUMENTS

| | | | | |
|---|---|---|---|---|
| 4,702,557 A | | 10/1987 | Beckmann et al. | |
| 5,276,747 A | * | 1/1994 | Pan | 385/34 |
| 5,612,813 A | * | 3/1997 | Damman et al. | 359/281 |
| 5,867,300 A | * | 2/1999 | Onaka et al. | 359/283 |
| 5,912,766 A | * | 6/1999 | Pattie | 359/484 |
| 6,101,026 A | * | 8/2000 | Baney | 359/341.41 |
| 6,195,479 B1 | * | 2/2001 | Pan | 385/18 |
| 6,278,547 B1 | * | 8/2001 | Betin | 359/484 |
| 6,631,238 B2 | * | 10/2003 | Liu et al. | 385/140 |
| 2003/0026583 A1 | * | 2/2003 | Hoyt et al. | 385/140 |

FOREIGN PATENT DOCUMENTS

| | | | |
|---|---|---|---|
| EP | 849902 A2 | * | 6/1998 |
| JP | 60-222818 A | * | 11/1985 |
| JP | 04-060511 A | * | 2/1992 |
| JP | 04-073712 A | * | 3/1992 |

* cited by examiner

*Primary Examiner*—John Juba, Jr.

(57) ABSTRACT

An optical apparatus and method for selectively transmitting optical signals utilizes an optical component having a controllable optical state to selectively manipulate the optical signals so that transmission of the optical signals through the optical apparatus is controlled. The optical apparatus is configured so that optical signals from a first port of the optical apparatus are transmitted to a second port of the optical apparatus regardless of the optical state of the optical component. The optical apparatus is further configured so that optical signals from the second port are not transmitted to the first port unless the optical component is switched to an active optical state.

16 Claims, 7 Drawing Sheets

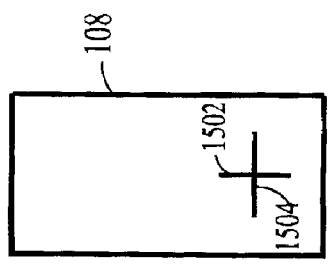
Fig.19
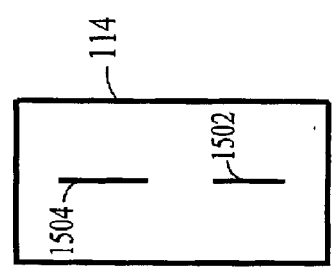
Fig.18
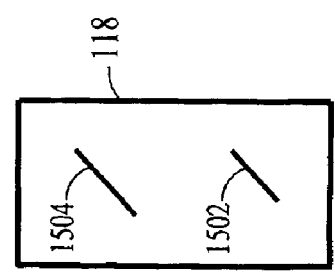
Fig.17
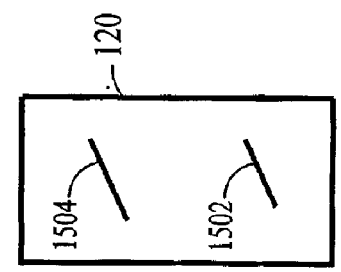
Fig.15
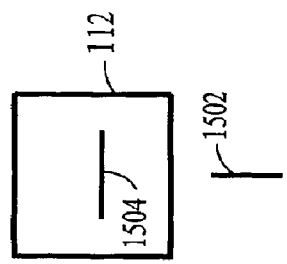
Fig.16
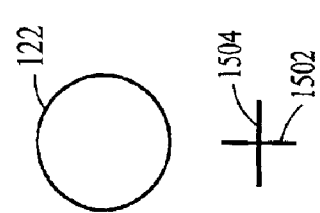
Fig.23
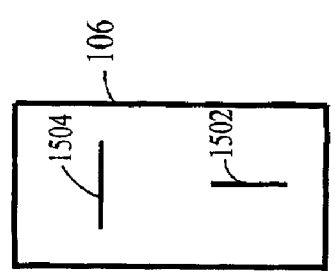
Fig.22
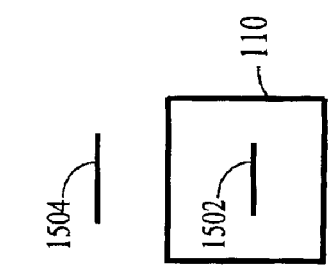
Fig.21
Fig.20

Receive forward propagating optical signals at a first port of a switchable optical isolator — 2902 receive rearward propagating optical signals at a second port of the switchable optical isolator — 2904

Selectively manipulate the rearward propagating optical signals using an ECB devices so that the signals are not transmitted to the first port unless the ECB device is in an active optical state. — 2906

Manipulate the forward propagating optical signals so that the signals are transmitted to the second port regardless of the optical state of the ECB device — 2908

Fig. 29

OPTICAL APPARATUS AND METHOD FOR SELECTIVELY TRANSMITTING OPTICAL SIGNALS

FIELD OF THE INVENTION

The invention relates generally to optical devices, and more particularly to an optical isolator.

BACKGROUND OF THE INVENTION

Continuing innovations in the field of fiber optic technology have contributed to the increasing use of fiber optics in communication networks. The flexibility and reliability of optical communication networks are greatly increased by the availability of nonreciprocal optical devices such as optical circulators and optical isolators. Optical circulators enable a bi-directional optical fiber to be coupled to both an input optical fiber and an output optical fiber. Optical isolators provide forward propagation of optical signals through an optical fiber, while inhibiting unwanted back reflection and scattering.

Optical isolators are particularly useful when used in optical communication networks with devices that are sensitive to spurious reflections. As an example, some lasers tend to be unstable if the laser output is reflected back to the laser. As another example, reflected optical signals can cause an optical amplifier to oscillate, which may adversely affect the operation of the amplifier.

A common optical isolator includes a combination of walk-off crystals, wave plates and Faraday rotators. The walk-off crystals are typically used to selectively displace the orthogonal polarization components of optical signals to separate and/or combine the optical signals. The wave plates are used to provide reciprocal rotation to the polarization components of the optical signals. Reciprocal rotation means that the rotational direction for forward propagating polarization components is counter to the rotational direction for rearward propagating polarization components when viewed from a fixed reference point. The Faraday rotators provide nonreciprocal rotation to the polarization components of the optical signals. Nonreciprocal rotation means that the rotational direction for forward propagating polarization components is the same as the rotational direction for rearward propagating polarization components when viewed from a fixed reference point. The rotations caused by the wave plates and the Faraday rotators are such that only forward propagating optical signals from an input optical fiber are transmitted to an output optical fiber through the optical isolator. Thus, rearward propagating optical signals from the output optical fiber are not transmitted to the input optical fiber through the optical isolator. Consequently, reflected optical signals are not transmitted back to a light source or an optical amplifier.

Although optical isolators are useful for the operation of optical communication networks, the same optical isolators impede network measurements due to their nonreciprocal function. As an example, Optical Time Domain Reflectometer (OTDR) is a powerful network tool to characterize an optical fiber. OTDR is used to estimate optical fiber length and overall attenuation, including splice and mated-connected losses, and to locate a breaking point position of the optical fiber by measuring the reflection and scattering of injected optical pulses. However, optical isolators in an optical communication network significantly reduce the amount of light that is reflected and scattered. Thus, the optical isolators tend to dramatically suppress the measurability of the optical communication network by an OTDR. A common solution to this problem is to use jumper fiber cables to bypass the optical isolators in the optical communication network. However, the use of jumper fiber cables is an intrusive method that requires extensive labor and long recovery time for the optical communication network.

In view of this concern, there is a need for an optical isolator that does not suppress the measurability of optical communication networks.

SUMMARY OF THE INVENTION

An optical apparatus and method for selectively transmitting optical signals utilizes an optical component having a controllable optical state to selectively manipulate the optical signals so that transmission of the optical signals through the optical apparatus is controlled. The optical apparatus is configured so that optical signals from a first port of the optical apparatus are transmitted to a second port of the optical apparatus regardless of the optical state of the optical component. The optical apparatus is further configured so that optical signals from the second port are not transmitted to the first port unless the optical component is switched to an active optical state. Thus, the controllable optical component allows the optical apparatus to function as a convention optical isolator when the optical component is switched to an inactive state, allowing only the optical signals from the first port to be transmitted through the apparatus. However, the controllable optical component also allows the optical apparatus to be deactivated, allowing the optical signals from both the first and second ports to be transmitted through the optical apparatus. Consequently, reflection-based network measurements can be made without interference from the optical apparatus by deactivating the optical apparatus.

An optical apparatus in accordance with the invention includes a first port to receive first optical signals, a second port second optical signals and an optical assembly. The optical assembly includes an optical component having a controllable optical state to selectively manipulate the second optical signals so that the second optical signals are not transmitted from the second port to the first port unless the optical component is in a first controlled optical state, e.g., an active optical state. However, the optical assembly is configured to transmit the first optical signals from the first port to the second port regardless of the controllable optical state of the optical component.

The optical assembly may include an optical device that is configured to selectively displace polarization components of the first and second optical signals. The optical assembly may also include at least one wave plate and at least one nonreciprocal rotator, such as a Faraday rotator, to manipulate the polarization components of the first and second optical signals.

In an embodiment, the optical component includes an electrically controllable birefringent device, which may contain a liquid crystal cell. In this embodiment, the electrically controllable birefringent device may be configured to substantially function as a wave plate when the optical component is switched to the first controlled optical state.

A method of selectively transmitting optical signals in accordance with the invention includes receiving first optical signals at a first port, receiving second optical signals at a second port, selectively manipulating the second optical signals using an optical component having a controllable optical state so that the second optical signals are not transmitted from the second port to the first port unless the optical component is in a first controlled optical state, and manipulating the first optical signals so that the first optical signals are transmitted from the first port to the second port regardless of the controllable optical state of the optical component. The optical component may include an electrically controllable birefringent device.

In an embodiment, the selectively manipulating of the second optical signals includes changing the controllable optical state of the optical component between a second controlled optical state and the first controlled optical state. The changing of the controllable optical state of the optical component may include changing an electric field in the optical component such that the controllable optical state of the optical component is switched to the first controlled optical state, in which the optical component is configured to substantially function as a wave plate. In the first controlled optical state, the method may further include rotating polarization components of the second optical components as the polarization components pass through the optical component. The changing of the controllable optical state of the optical component may also include changing the electric field in the optical component such that the controllable optical state is switched to the second controlled optical state. In the second controlled optical state, the method may further include not rotating the polarization components of the second optical signals as the polarization components pass through the optical component.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 15–23 show the polarization components of a rearward propagating optical signal at the rearward faces of selected components of the switchable optical isolator when the switchable optical isolator is switched to an inactive optical state.

FIG. 29 is a process flow diagram of a method of selectively transmitting optical signals in accordance with the present invention.

DETAILED DESCRIPTION

Figure 1:
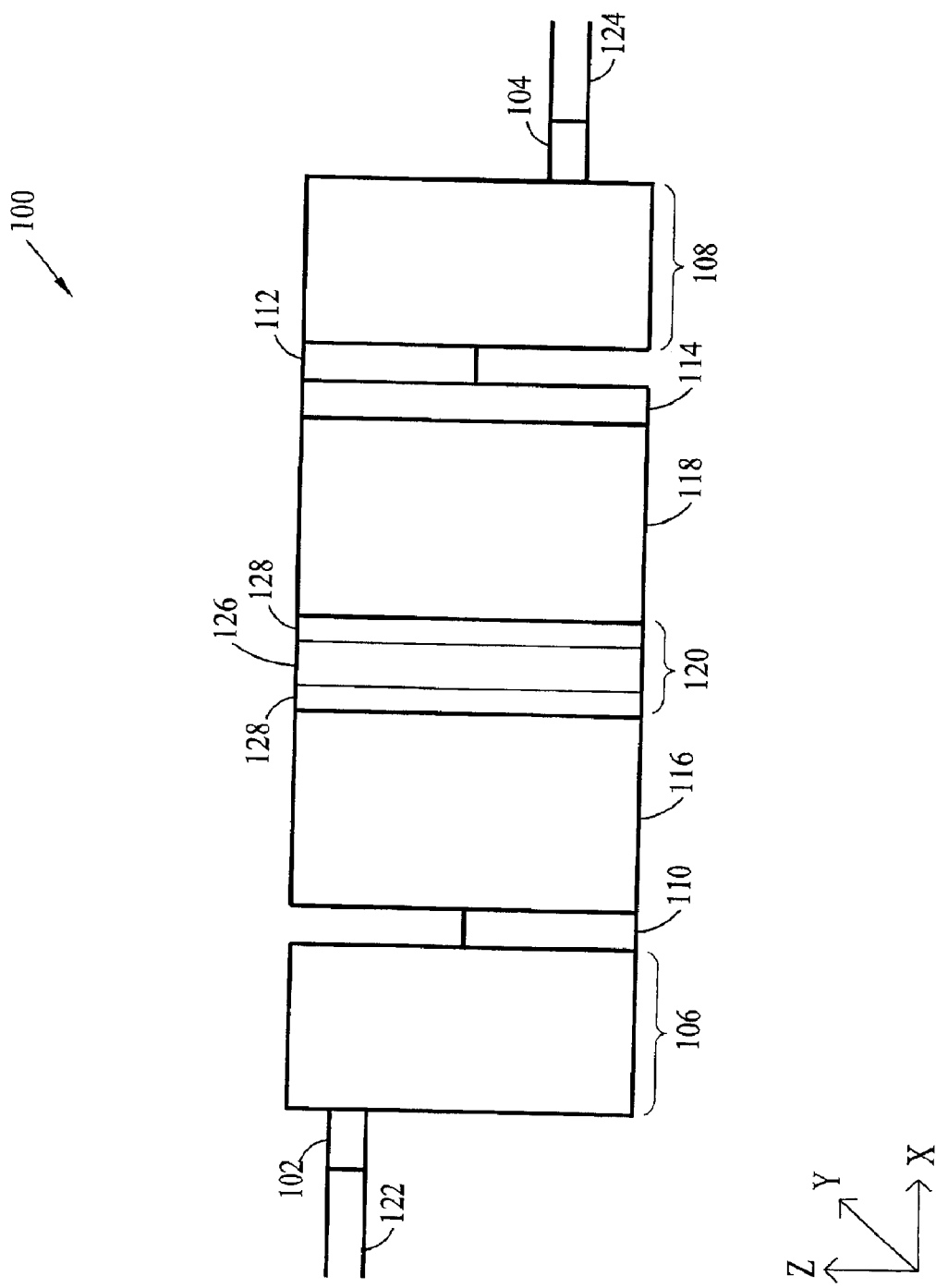
FIG. 1 shows a switchable optical isolator in accordance with the present invention.

With reference to FIG. 1, a switchable optical isolator 100 in accordance with the invention is shown. The switchable optical isolator can be controlled to operate in either a nonreciprocal state or a reciprocal state. In the nonreciprocal state, the switchable optical isolator functions as a normal optical isolator, transmitting forward propagating optical signals and blocking rearward propagating optical signals. Forward direction is defined herein as being in the positive X direction, while rearward direction is defined as being in the negative X direction. However, in the reciprocal state, the blocking of rearward propagating optical signals by the switchable optical isolator is disabled so that the rearward propagating optical signals are transmitted, as well as forward propagating optical signals. Consequently, network measurements can be made by, for example, an Optical Time Domain Reflectometer (OTDR), without interference from the switchable optical isolator.

The switchable optical isolator 100 includes collimating lenses 102 and 104, optical separating/combining devices 106 and 108, half-wave plates 110 and 112, a quarter-wave plate 114, Faraday rotators 116 and 118, and an electrically controllable birefringent (ECB) device 120. As shown in FIG. 1, the collimating lenses are positioned at the opposite ends of the switchable optical isolator. The collimating lenses function as ports to receive and output forward and rearward propagating optical signals from optical fibers 122 and 124. The remaining components of the switchable optical isolator are positioned between the collimating lenses in the following order from the collimating lens 102 to the collimating lens 104: the optical separating/combining device 106, the half-wave plate 110, the Faraday rotator 116, the ECB device 120, the Faraday rotator 118, the quarter-wave plate 114, the half-wave plate 108, and the optical separating/combining device 108.

The optical separating/combining device 106 of the switchable optical isolator 100 operates to separate the orthogonal polarization components of a forward propagating optical signal such that the horizontally orientated polarization component is transmitted to the half-wave plate 110, while the vertically orientated polarization component is transmitted directly to the Faraday rotator 116, bypassing the half-wave plate 110. As used herein, the vertical orientation is parallel to the Z axis, while the horizontal orientation is parallel to the Y axis. The optical separating/combining device further operates to combine the orthogonal polarization components of a rearward propagating optical signal such that the combined optical signal is only transmitted to the optical fiber 122 through the collimating lens 102 when the switchable optical isolator is in the reciprocal state, as described in more detail below.

Similarly, the optical separating/combining device 108 of the switchable optical isolator 100 operates to separate the orthogonal polarization components of a rearward propagating optical signals such that the horizontally orientated polarization components is transmitted to the half-wave plate 112, while the vertically orientated polarization component is transmitted directly to the quarter-wave plate 114, bypassing the half-wave plate. Furthermore, the optical separating/combining device 108 operates to combine the orthogonal polarization components of a forward propagating optical signal such that the forward propagating optical signal is transmitted to the optical fiber 124 through the collimating lens 104 regardless of the optical state of the switchable optical isolator.

Figure 2:
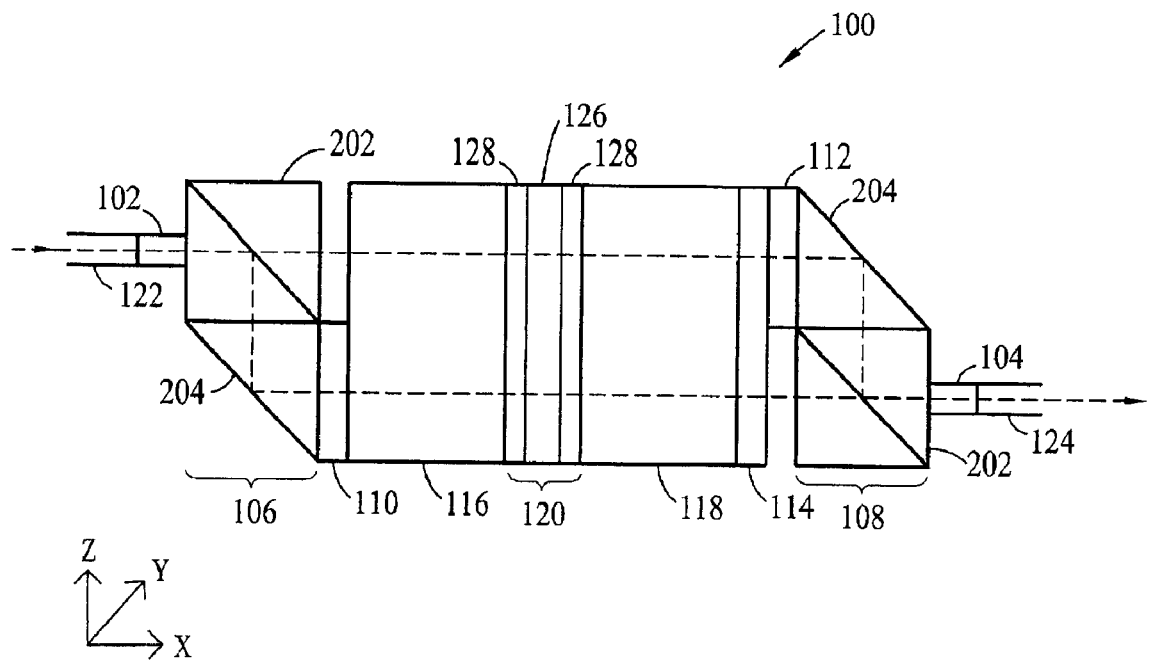
FIGS. 2 and 3 show the switchable optical isolator with optical separating/combining devices in accordance with a first embodiment of the invention.
Figure 3:
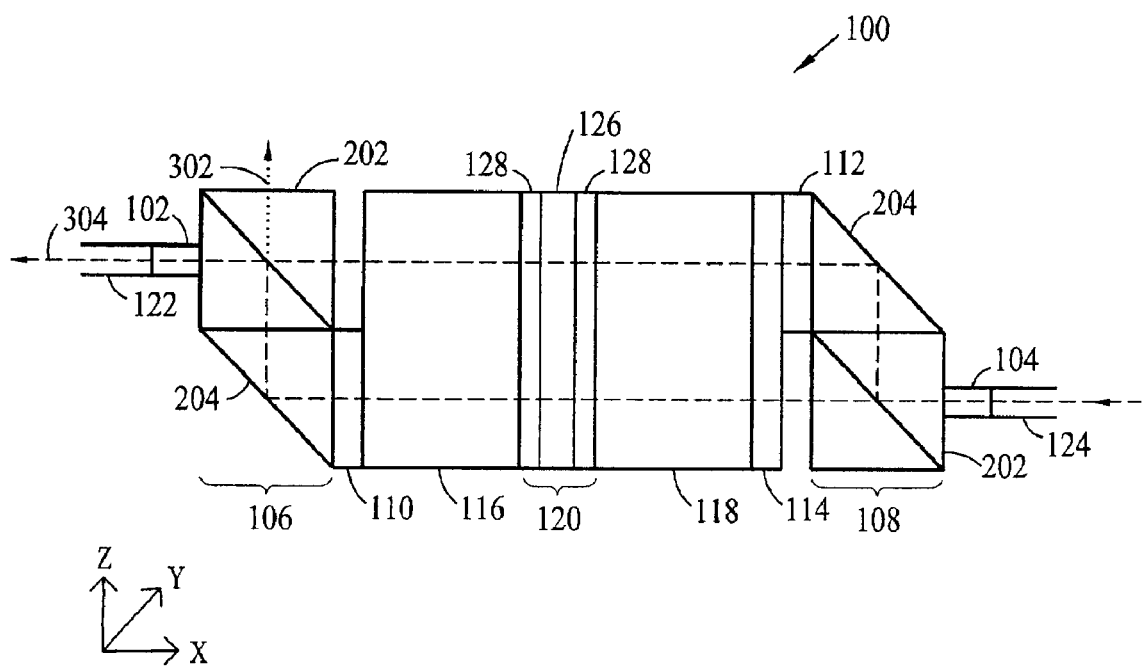

In a first embodiment, each of the optical separating/combining devices 102 and 104 includes a polarizing beamsplitter 202 and a reflective element 204, such as a prism, as illustrated in FIGS. 2 and 3. The polarizing beamsplitters of the optical separating/combining devices are configured to selectively reflect horizontally orientated polarization components of optical signals. The polarizing beamsplitters can thus separate or combine orthogonal polarization components of forward and rearward propagating optical signals, as shown in FIGS. 2 and 3. For forward propagating optical signals, the orthogonal polarization components are separated by the polarizing beamsplitter of the optical separating/combining device 106 and then combined by the polarizing beamsplitter of the optical separating/combining device 108 such that the combined optical signals are transmitted to the optical fiber 124 regardless of the optical state of the switchable optical isolator 100. For rearward propagating optical signals, the orthogonal polarization components are separated by the polarizing beamsplitter of the optical separating/combining device 108 and then combined by the polarizing beamsplitter of the optical separating/combining device 106. However, the combined optical signals are transmitted to the optical fiber 122 only when the switchable optical isolator is in the reciprocal state, as described in more detail below. The reflective elements 204 of the optical separating/combining devices are configured to reflect polarization components such that the resulting direction of the reflected polarization components is perpendicular to the original direction.

Figure 4:
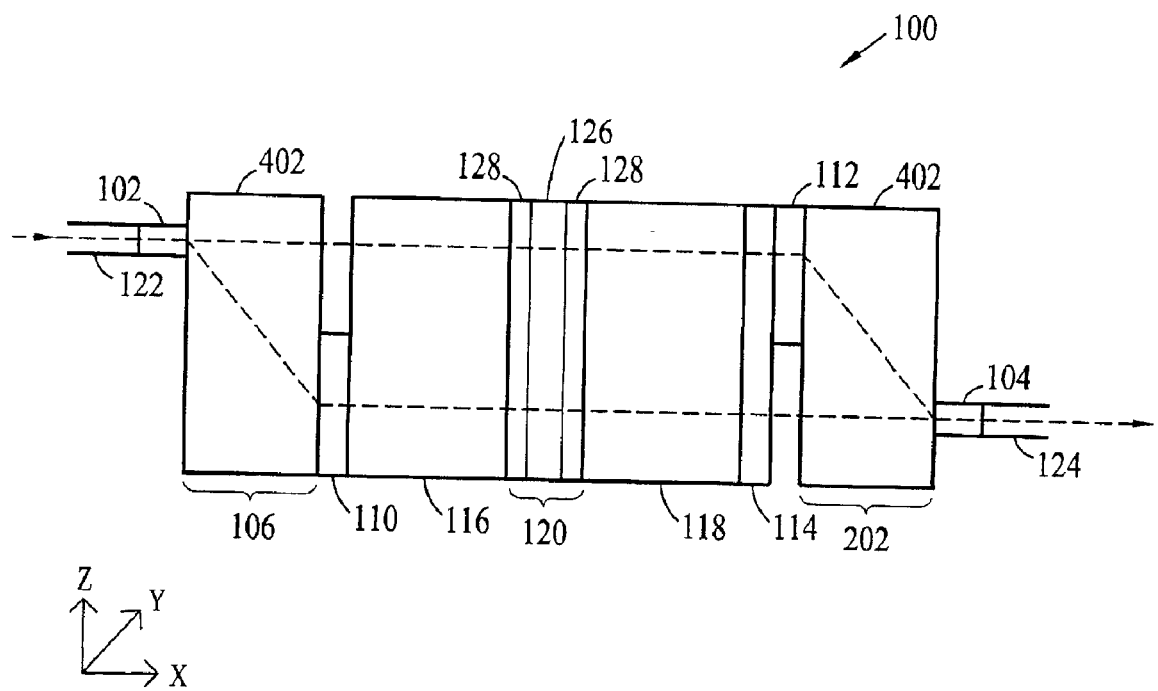
FIGS. 4 and 5 show the switchable optical isolator with optical separating/combining devices in accordance with a second embodiment of the invention.
Figure 5:
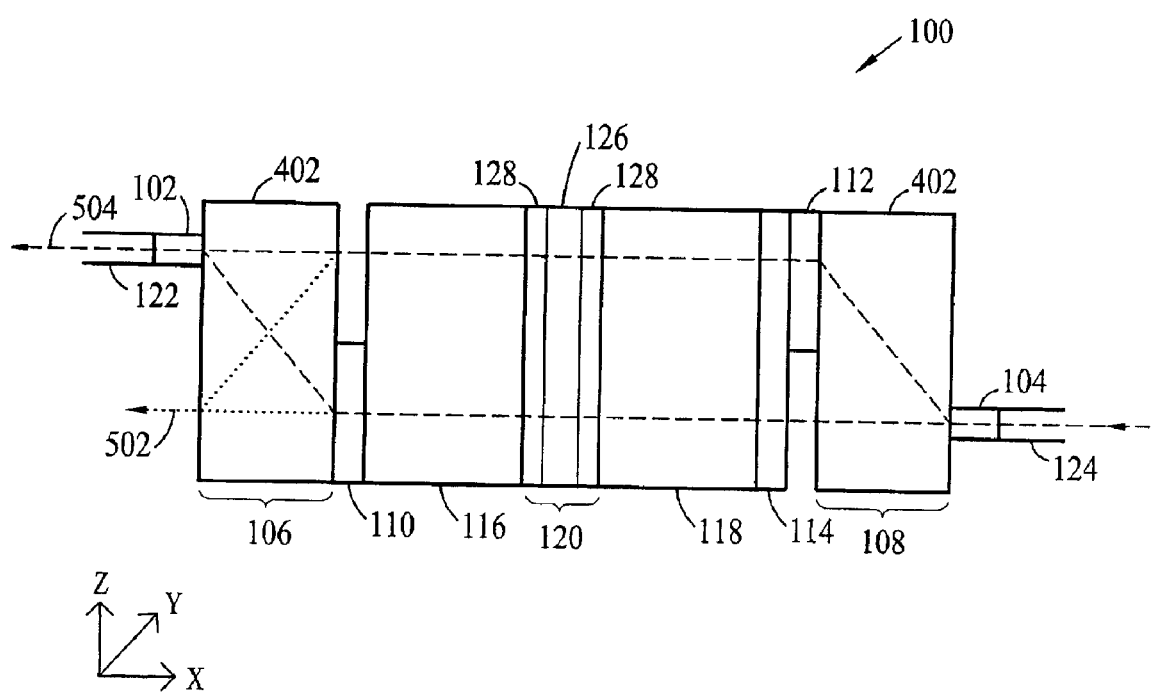

In a second embodiment, each of the optical separating/combining devices 106 and 108 includes a walk-off crystal 402, as illustrated in FIGS. 4 and 5. The walk-off crystals perform a similar function as the polarizing beamsplitters 202 and the reflective elements 204. The walk-off crystals are configured to selectively displace horizontally orientated polarization components of optical signals. Thus, the walk-off crystals can separate or combine orthogonal polarization components of forward and rearward propagating optical signals, as shown in FIGS. 4 and 5. Similar to the first embodiment, for forward propagating optical signals, the orthogonal polarization components are separated by the walk-off crystal of the optical separating/combining device 106 and then recombined by the walk-off crystal of the optical separating/combining device 108 such that the combined optical signals are transmitted to the optical fiber 124 regardless of the optical state of the switchable optical isolator 100. For rearward propagating optical signals, the orthogonal polarization components are separated by the walk-off crystal of the optical separating/combining device 108 and then recombined by the walk-off crystal of the optical separating/combining device 106. However, for rearward propagating optical signals, the combined optical signals are transmitted to the optical fiber 122 only when the switchable optical isolator is in the reciprocal state, as described in more detail below.

The half-wave plates 110 and 112 of the switchable optical isolator 100 are configured to provide ninety-degree rotation for the polarization components of forward and rearward propagating optical signals. Unless stated otherwise, degrees are defined from the positive Z axis in the clockwise direction. The optical axes of the half-wave plates are forty-five degrees, as viewed from the optical fiber 122. Due to the orientation of the optical axes, the half-wave plates are configured to rotate a horizontally orientated polarization component to the vertical orientation.

The quarter-wave plate 114 of the switchable optical isolator 100 is configured to provide forty-five degree rotation for the polarization components of forward and rearward propagating optical signals. The optical axis of the quarter-wave plate is twenty-two and one half degrees from the Z axis, as viewed from the optical fiber 122. Thus, the quarter-wave plate is configured to rotate the polarization components of forward propagating optical signals that are orientated at forty-five degrees to the vertical orientation. Consequently, the quarter-wave plate is configured to rotate the vertically orientated polarization components of rearward propagating optical signals to the forty-five degree orientation, as viewed from the optical fiber 124.

The Faraday rotators 116 and 118 of the switchable optical isolator 100 are configured to provide twenty-two and one half degrees of clockwise rotation for the polarization components of forward propagating optical signals, as viewed from the optical fiber 122. Unlike wave plates, the Faraday rotators provide nonreciprocal rotation. Consequently, the Faraday rotators provide twenty-two and one half degrees of counterclockwise rotation for rearward propagating optical signal, as viewed from the fiber optic 124. Faraday rotators are well known in the field of optical technology, and thus, are not further described herein.

The ECB device 120 of the switchable optical isolator 100 operates to selectively rotate the polarization components of rearward propagating optical signals in response to changes in electric field. The ECB device is configured to be optically passive or optically active in response to an applied electric field. The ECB device determines the optical state of the switchable optical isolator. When the ECB device is optically passive, the switchable optical isolator is in the nonreciprocal state. When the ECB device is optically active, the switchable optical isolator is in the reciprocal state, deactivating the switchable optical isolator. The ECB device includes an ECB layer 126 in the form of a liquid crystal (LC) cell, which is sandwiched between two transparent electrode layers 128. In alternative configurations, the ECB device may include another type of ECB layer instead of the LC cell, such as a layer of Lithium Niobate. Although the LC cell can be configured to be optically active in the presence of applied electric field or in the absence of applied electric field, the LC cell is described herein as being configured to be optically active in the presence of applied electric field. The electric field is generated by providing a voltage difference of, for example, five volts, to the electrode layers. The LC cell is in a vertical alignment mode. Thus, without applied electric field, the LC cell is hemeotropically aligned, allowing polarization components of optical signals to pass without rotation. However, when electric field applied, the LC cell functions as a half-wave plate. The rubbing direction of the LC cell, or the optical axis of the LC cell when optically active, is twenty-two and one half degrees from the Z axis, as viewed from the optical fiber 122. Thus, the optically active LC cell allows polarization components of forward propagating optical signals that are orientated at twenty-two and one half degrees to pass without rotation, since the orientations of the polarization components are parallel to the optical axis of the LC cell. In the rearward direction, the optically active LC cell rotates polarization components of optical signals orientated at sixty-seven and one half degrees by ninety degrees.

Although the ECB device 120 is described herein as including the single ECB layer 126 sandwiched between the transparent electrode layers 128, the ECB device can be any active optical device that can be switched between a passive optical state, in which the ECB device does not show any optical birefringence, and an active optical state, in which the ECB device functions as a half-wave plate. As an example, the ECB device may include a planar aligned half-wave retardation LC cell sandwiched between transparent electrode layers and a half-wave plate with fast optical axis that is parallel to the slow axis of the LC cell. Thus, when the LC cell is optically passive, e.g., voltage is not applied, the birefringence of the LC cell compensates the birefringence of the half-wave plate such that the ECB device does not show any optical birefringence. However, when the LC cell is optically active, e.g., voltage is applied, the birefringence of the LC cell disappears and only the birefringence of the half-wave plate remains so that the ECB device now functions as a half-wave plate.

Figure 6:
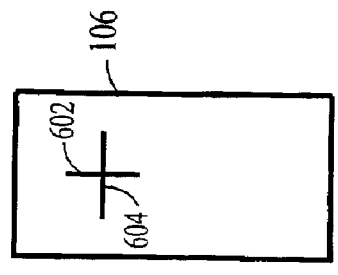
FIGS. 6–14 show the polarization components of a forward propagating optical signal at the forward faces of selected components of the switchable optical isolator regardless of the optical state of the switchable optical isolator.

The operation of the switchable optical isolator 100 on forward propagating optical signals is described with reference to FIGS. 6–14, which illustrate the polarization components 602 and 604 of a forward propagating optical signal at the forward face of selected components of the switchable optical isolator. In FIG. 6, the orthogonal polarization components 602 and 604 of the optical signal from the optical fiber 122 are shown at the optical separating/combining device 106. The polarization component 602 is vertically orientated, while the polarization component 604 is horizontally orientated.

Figure 7:
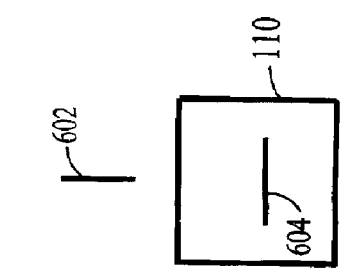

In the first embodiment, the horizontally orientated polarization component 604 is reflected by the polarizing beamsplitter 202 of the optical separating/combining device 106 toward the reflective element 204, while the vertically orientated polarization component 602 is allowed to pass through the polarizing beamsplitter 202 toward the Faraday rotator 116, as illustrated in FIG. 2. The reflected polarization component 604 is further reflected by the reflective element 204 toward the half-wave plate 110. Consequently, the polarization components are separated such that only the polarization component 604 is on an optical path to propagate through the half-wave plate 110, as shown in FIG. 7.

In the second embodiment, the horizontally orientated polarization component 604 is selectively displaced by the walk-off crystal 402 of the optical separating/combining device 106, while the vertically orientated polarization component is allowed to pass through the walk-off crystal 402 toward the Faraday rotator 116 without displacement, as illustrated in FIG. 4. Similar to the first embodiment, the polarization components are thus separated such that only the polarization component 604 is on an optical path toward the half-wave plate 110, as illustrated in FIG. 7.

Figure 8:
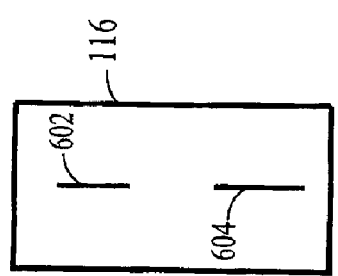
Figure 9:
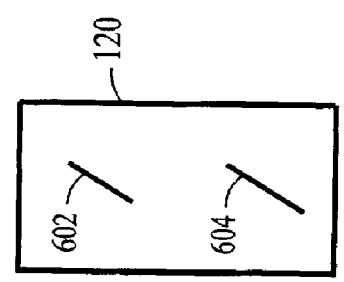
Figure 10:
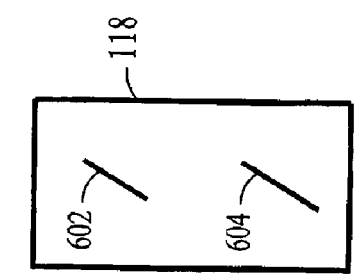

In either embodiment, the polarization component 604 is then rotated ninety degrees by the half-wave plate 110. Since the polarization component 602 does not pass through the half-wave plate 110, both polarization components are now vertically orientated, as illustrated in FIG. 8. The polarization components are then rotated twenty-two and one half degrees in the clockwise direction by the Faraday rotator 116, as illustrated in FIG. 9. After the Faraday rotator 116, the polarization components travel through the ECB device 120 without rotation regardless of whether the ECB device is optically active or optically inactive, as illustrated in FIG. 10. If the ECB device is optically passive, i.e., the switchable optical isolator 100 is in the nonreciprocal state, then the polarization components are allowed to pass without any rotation due to the passiveness of the ECB device. If the ECB device is optically active, i.e., the switchable optical isolator is in the reciprocal state, then the polarization components are again allowed to pass without rotation because the orientation of the polarization components is parallel to the optical axis of the optically active ECB device.

Figure 11:
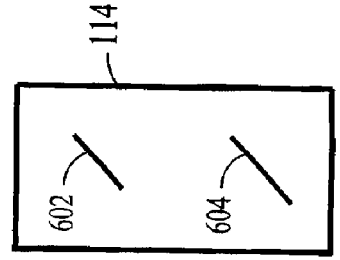
Figure 12:
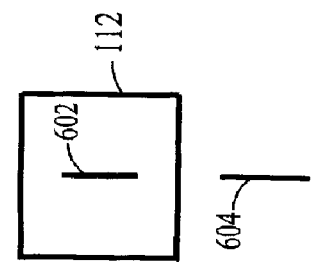
Figure 13:
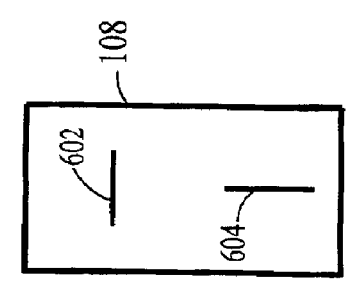

After passing through the ECB device 120 without rotation, the polarization components 602 and 604 are then rotated twenty-two and one half degrees in the clockwise direction by the Faraday rotator 118. Thus, the polarization components are now orientated at forty-five degrees, as illustrated in FIG. 11. The polarization components are then rotated forty-five degrees in the counterclockwise direction by the quarter-wave plate 112. Consequently, the polarization components are vertically orientated, as illustrated in FIG. 12. The polarization component 602 is then rotated ninety degrees by the half-wave plate 112, while the polarization component 604 is transmitted to the optical separating/combining device 108, bypassing the half-wave plate 112. Therefore, at the optical separating/combining device 108, the polarization components are again orthogonal, as illustrated in FIG. 13.

Figure 14:
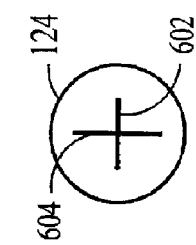

In the first embodiment, the vertically orientated polarization component 604 is allowed to pass through the polarizing beamsplitter 202 of the optical separating/combining device 108 toward the optical fiber 124 without being reflected, as illustrated in FIG. 2. However, the horizontally orientated polarization component 602 is reflected off the reflective element 204 of the optical separating/combining device 108 toward the polarizing beamsplitter. The polarization component 602 is then further reflected by the polarizing beamsplitter toward the optical fiber 124, combining with the polarization component 604, as illustrated in FIG. 14. Thus, the forward propagating optical signal is transmitted from the optical fiber 122 to the optical fiber 124 through the switchable optical isolator 100.

In the second embodiment, the vertically orientated polarization component 604 is allowed to pass through the walk-off crystal 402 of the optical separating/combining device 108 without displacement toward the optical fiber 124, as illustrated in FIG. 4. However, the horizontally orientated polarization component 602 is displaced by the walk-off crystal such that the polarization component 602 is combined with the vertically orientated polarization component 604, as illustrated in FIG. 14. Thus, the forward propagating optical signal is transmitted from the optical fiber 122 to the optical fiber 124 through the switchable optical isolator 100.

The operation of the switchable optical isolator 100 in the nonreciprocal state on rearward propagating optical signals is described with reference to FIGS. 15–23, which illustrate the polarization components 1502 and 1504 of a rearward propagating optical signal at the rearward face of selected components of the switchable optical isolator. In FIG. 15, the orthogonal polarization components 1502 and 1504 of the rearward propagating optical signal from the optical fiber 124 are shown at optical separating/combining device 108. The polarization component 1502 is vertically orientated, while the polarization component 1504 is horizontally orientated.

In the first embodiment, the horizontally orientated polarization component 1504 is reflected by the polarizing beamsplitter 202 of the optical separating/combining device 108 toward the reflective element 204, while the vertically orientated polarization component 1502 is allowed to pass through the polarizing beamsplitter 202 toward the quarter-wave plate 114, as illustrated in FIG. 3. The reflected polarization component 1504 is further reflected by the reflective element 204 toward the half-wave plate 112. Consequently, the polarization components are separated such that only the polarization component 1504 is on an optical path to propagate through the half-wave plate 112, as shown in FIG. 16.

In the second embodiment, the horizontally orientated polarization component 1504 is selectively displaced by the walk-off crystal 402 of the optical separating/combining device 108, while the vertically orientated polarization component 1502 is allowed to pass through the walk-off crystal

402 toward the quarter-wave plate 114 without displacement, as illustrated in FIG. 5. Similar to the first embodiment, the polarization components are thus separated such that only the polarization component 1504 is on an optical path toward the half-wave plate 112, as illustrated in FIG. 16.

In either embodiment, the polarization component 1504 is then rotated ninety degrees by the half-wave plate 112. Since the polarization component 1502 does not pass through the half-wave plate 112, both polarization components are now vertically orientated, as illustrated in FIG. 17. The polarization components are then rotated forty-five degrees in the clockwise direction by the quarter-wave plate 114, as illustrated in FIG. 18. Due to the nonreciprocal property of the Faraday rotator 118, the polarization components are further rotated twenty-two and one half degrees in the clockwise direction by the Faraday rotator 118, as illustrated in FIG. 19. After the Faraday rotator, the polarization components travel through the optically inactive ECB device 120 without rotation, as illustrated in FIG. 20. The polarization components are then rotated twenty-two and one half degrees in the clockwise direction by the Faraday rotator 116. Thus, the polarization components are now horizontally orientated, as illustrated in FIG. 21. Due to the optical paths of the polarization components, only the polarization component 1502 travels through the half-wave plate 110. Consequently, only the polarization component 1502 is rotated ninety degrees by the half-wave plate 110. Thus, the polarization component 1502 is now vertically orientated, while the polarization component 1504 remains horizontally orientated, as illustrated in FIG. 22.

In the first embodiment, the vertically orientated polarization component 1502 is reflected off the reflective element 204 of the optical separating/combining device 106 toward to the polarizing beamsplitter 204. The reflected polarization component 1502 then travels in the vertical direction through the polarizing beamsplitter without being reflected, as indicated by an optical path 302 in FIG. 3. However, the horizontally orientated polarization component 1504 is reflected off the polarizing beamsplitter 202 in the vertical direction, combining with the polarization component 1502 along the optical path 302. Since the combined polarization components of the rearward propagating optical signal are not on an optical path to the optical fiber 122, the rearward propagating optical signal is not transmitted to the optical fiber 122.

In the second embodiment, the vertically orientated polarization component 1502 is allowed to pass through the walk-off crystal 402 of the optical separating/combining device 106 without displacement, as indicated by an optical path 502 in FIG. 5. However, the horizontally orientated polarization component 1504 is displaced by the walk-off crystal 402 such that the polarization component 1504 is combined with the vertically orientated polarization component 1502 along the optical path 502, as illustrated in FIG. 23. Since the combined polarization components of the rearward propagating optical signal are not on an optical path to the optical fiber, as shown in FIG. 23, the rearward propagating optical signal is not transmitted to the optical fiber 122.

Figures 24, 25, 26, 27, 28:
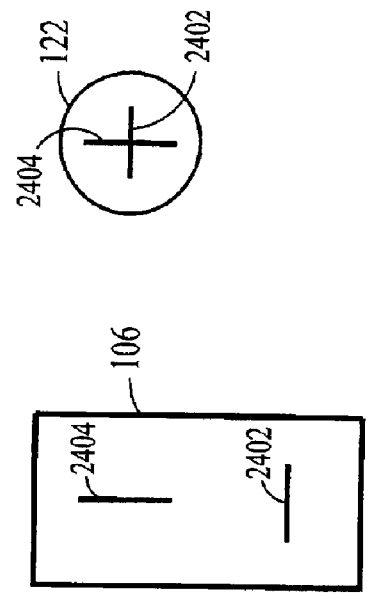
FIGS. 24–28 show the polarization components of a rearward propagating optical signal at the rearward faces of selected components of the switchable optical isolator when the switchable optical isolator is switched to an active optical state.

The operation of the switchable optical isolator 100 in the reciprocal state on rearward propagating optical signals is described with reference to FIGS. 24–28, which illustrate the polarization components 2402 and 2404 of a rearward propagating optical signal at the rearward face of selected components of the switchable optical isolator. Initially, the polarization component 2402 is vertically orientated and the polarization component 2404 is horizontally orientated. From the optical fiber 124 up to the ECB device 120, the operation of the switchable optical isolator in the reciprocal state on rearward propagating optical signals is the same as the switchable optical isolator in the nonreciprocal state on rearward propagating optical signals. Thus, the description will begin at the ECB device, where the polarization components 2402 and 2404 of the rearward propagating optical signal are both orientated at sixty-seven and one half degrees, as illustrated in FIG. 24.

Since the ECB device 120 is functioning as a half-wave plate when the switchable optical isolator 100 is in the reciprocal state, the polarization components 2402 and 2404 of the rearward propagating optical signal are rotated ninety degrees by the ECB device. Thus, after traveling through the ECB device, the polarization components are orientated at negative twenty-two and one half degrees, or three hundred thirty-seven and one half degrees, as illustrated in FIG. 25. The polarization components are then rotated twenty-two and one half degrees in the clockwise direction by the Faraday rotator 116. Consequently, the polarization components are both vertically orientated, as illustrated in FIG. 26. Due to the optical paths of the polarization components, only the polarization component 2402 travels through the half-wave plate 110. Thus, the polarization component 2402 is rotated ninety degrees by the half-wave plate 110 to the horizontal orientation, while the polarization component 2404 remains vertically orientated, as illustrated in FIG. 27.

In the first embodiment, the horizontally orientated polarization component 2402 is reflected off the reflective element 204 of the optical separating/combining device 106 toward the polarizing beamsplitter 202, as illustrated in FIG. 3. The polarization component 2402 is then further reflected by the polarizing beamsplitter toward the optical fiber 122, as indicated by an optical path 304 in FIG. 3. However, the vertically orientated polarization component 2404 travels through the polarizing beamsplitter without reflection toward the optical fiber 122, combining with the horizontally orientated polarization component 2402 along the optical path 304, as illustrated in FIG. 28. Since the combined polarization components of the rearward propagating optical signal are on an optical path to the optical fiber 122, the rearward propagating optical signal is transmitted to the optical fiber 122.

In the second embodiment, the vertically orientated polarization component 2404 is allowed to pass through the walk-off crystal 402 of the optical separating/combining device 106 without displacement toward the optical fiber 122, as indicated by an optical path 504 in FIG. 5. However, the horizontally orientated polarization component 2402 is displaced by the walk-off crystal such that the polarization component 2402 is combined with the vertically orientated polarization component 2404 along the optical path 504, as illustrated in FIG. 28. Since the combined polarization components of the rearward propagating optical signal are on an optical path to the optical fiber 122, the rearward propagating optical signal is transmitted to the optical fiber 122.

A method of selectively transmitting optical signals in accordance with the invention is described with reference to the process flow diagram of FIG. 29. At block 2902, forward propagating optical signals are received at a first port of a switchable optical isolator, which corresponds to a collimating lens at the forward face of the switchable optical isolator. At block 2904, rearward propagating optical signals are received at a second port of the switchable optical isolator, which corresponds to a collimating lens at the rearward face of the switchable optical isolator. Next, at block 2906, the rearward propagating optical signals are selectively manipulated by an electrically controllable birefringent (ECB) device so that the rearward propagating optical signals are not transmitted from the second port to the first port unless the ECB device is in an active optical state. In the active optical state, the ECB device of the switchable optical isolator functions as a half-wave plate. The optical state of the ECB device is controlled by applied electric field. As an example, the ECB device is switched between the active optical state and an inactive optical state by applying and removing electric field. At block 2908, the forward propagating optical signals are manipulated so that the forward propagating optical signals are transmitted from the first port to the second port regardless of the optical state of the ECB device.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical apparatus for selectively transmitting optical signals comprising:
    a first port to receive first optical signals;
    a second port to receive second optical signals; and
    an optical assembly including an optical component having a controllable optical state to selectively manipulate said second optical signals so that said second optical signals are not transmitted from said second port to said first port unless said optical component is in a first controlled optical state, said optical assembly being configured to transmit said first optical signals from said first port to said second port regardless of said controllable optical state of said optical component, wherein said optical component includes an electrically controllable birefringent device, said electrically controllable birefringent device being configured to substantially function as a wave plate when said optical component is switched to said first controlled optical state.

2. The optical apparatus of claim 1 wherein said electrically controllable birefringent device includes electrodes to generate an electric field in said electrically controllable birefringent device.

3. The optical apparatus of claim 1 wherein said electrically controllable birefringent device includes a liquid crystal cell.

4. The optical apparatus of claim 1 wherein said optical assembly includes an optical device that is configured to selectively displace polarization components of said first and second optical signals.

5. The optical apparatus of claim 1 wherein said optical assembly includes at least one wave plate and at least one nonreciprocal polarization rotator to manipulate polarization components of said first and second optical signals.

6. The optical apparatus of claim 5 wherein said optical assembly includes a first Faraday rotator and a second Faraday rotator that are configured to collectively provide a predefined rotation for said polarization components of said first and second optical signals.

7. The optical apparatus of claim 6 wherein said optical component is positioned between said first and second Faraday rotators.

8. A method of selectively transmitting optical signals comprising:
    receiving first optical signals at a first port;
    receiving second optical signals at a second port;
    selectively manipulating said second optical signals using an optical component having a controllable optical state so that said second optical signals are not transmitted from said second port to said first port unless said optical component is in a first controlled optical state, including changing said controllable optical state between a second controlled optical state and said first controlled optical state by changing an electrical field in said optical component such that said controllable optical state is switched to said first controlled optical state, said optical component being configured to substantially function as a wave plate when switched to said first controlled optical state; and
    manipulating said first optical signals so that said first optical signals are transmitted from said first port to said second port regardless of said controllable optical state of said optical component.

9. The method of claim 8 wherein said optical component includes an electrically controllable birefringent device.

10. The method of claim 8 wherein said selectively manipulating of said second optical signals includes rotating polarization components of said second optical signals as said polarization components of said second optical signals pass through said optical component when said optical component is switched to said first controlled optical state.

11. The method of claim 8 wherein said changing of said controllable optical state of said optical component includes changing an electric field in said optical component such that said controllable optical state is switched to said second controlled optical state, said optical component being configured to be optically passive when switched to said second controlled optical state.

12. The method of claim 11 wherein said selectively manipulating of said second optical signals includes not rotating polarization components of said second optical signals as said polarization components of said second optical signals pass through said optical component when said optical component is switched to said second controlled optical state.

13. An optical apparatus for selectively transmitting optical signals comprising:
    a first port to receive first optical signals;
    a second port to receive second optical signals; and
    a means for selectively manipulating said first and second optical signals, said means having a controllable optical state such that said second optical signals are not transmitted from said second port to said first port unless said means is in a first controlled optical state, said means being configured to transmit said first optical signals from said first port to said second port regardless of said optical state of said optical component, said means including an electrically controllable birefringent device that is configured to substantially function as a wave plate when said means is switched to said first controlled optical state.

14. The optical apparatus of claim 13 wherein said electrically controllable birefringent device includes a liquid crystal cell.

15. The optical apparatus of claim 13 further comprising a pair of optical devices that are configured to separate and combine polarization components of said first and second optical signals, said optical devices being positioned such that said means is situated between said optical devices.

16. The optical apparatus of claim 15 further comprising a first Faraday rotator and a second Faraday rotator that are configured to collectively provide a predefined rotation for said polarization components of said first and second optical signals, said first and second Faraday rotators being positioned such that said means is situated between said first and second Faraday rotators.

* * * * *